United States Patent [19]

Elssner

[11] 4,198,563
[45] Apr. 15, 1980

[54] PHOTODETECTOR TIMER NETWORK

[76] Inventor: Egon H. Elssner, 58 Tuscaloosa Ave., Atherton, Calif. 94025

[21] Appl. No.: 927,473

[22] Filed: Jul. 24, 1978

[51] Int. Cl.² .......................................... H45B 39/03
[52] U.S. Cl. ............................. 250/214 AL; 315/360
[58] Field of Search ..... 250/214 R, 214 AL, 214 SW; 315/159, 360

[56] References Cited
U.S. PATENT DOCUMENTS 3,916,183  10/1975  Duve et al. .
4,008,415  2/1977   DeAvila-Serafin et al. .

Primary Examiner—David C. Nelms
Assistant Examiner—Darwin R. Hostetter
Attorney, Agent, or Firm—Thomas E. Schatzel

[57] ABSTRACT

A photodetector timer network for controlling the timing of application of electrical power to an electrical load responsive to ambient light conditions and including photodetector means for detecting the ambient light and generating a detector signal responsive thereto, means responsive to the detector signal for controlling electrical power from an external electrical source to an external electrical load and means for interrupting the electrical power to the electrical load at certain time intervals.

20 Claims, 4 Drawing Figures

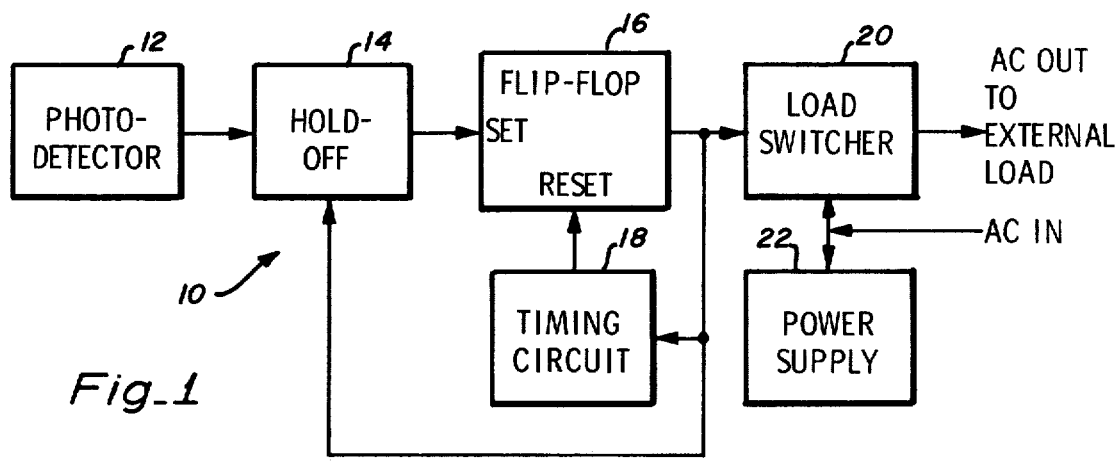
Fig_1
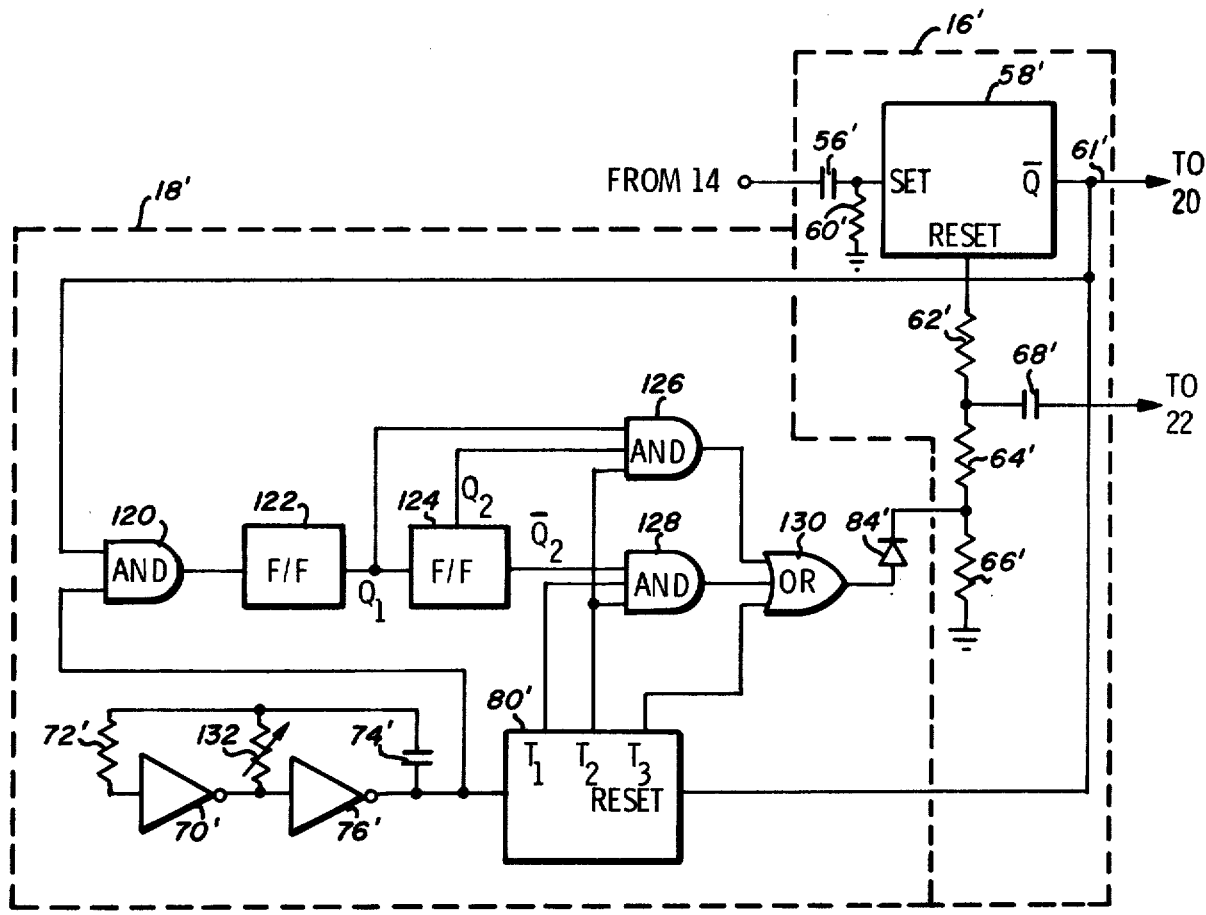
Fig_3

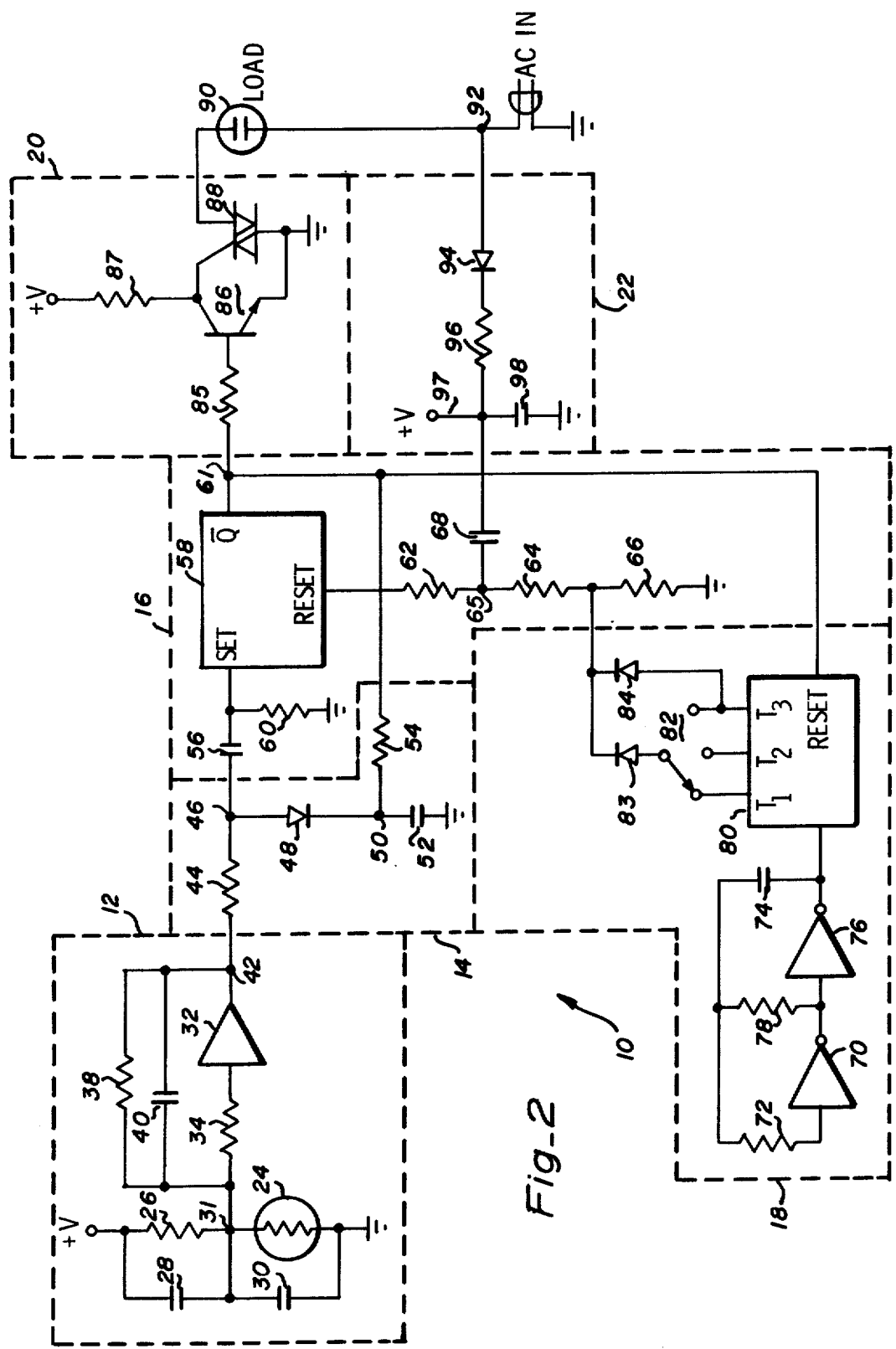
Fig_2

PHOTODETECTOR TIMER NETWORK

BACKGROUND OF THE INVENTION

1. Field of the Invention

The present invention relates generally to an ambient light detecting apparatus and more particularly to an ambient light detecting apparatus which controls the initial application of electrical power to an electrical load responsive to the ambient light conditions and retains application of the power to the electrical load notwithstanding the ambient light conditions.

2. Description of the Prior Art

In the prior art there are various mechanical clock timers including electrical clocks with switch means to control application of electrical power to an external load. If the power source controlling the timer is interrupted, then the mechanical clock timer fails. Further, these types of devices generally require generous application of power in order to be operational.

Also, the prior art includes photodetector on-off devices having no timing circuits but are primarily simplified to turn on when the ambient light decreases below a certain level and turn off when the light returns to a certain level. Further, clock timers in the prior art include microprocessors which count the alternating current line cycle as a clock. The microprocessor is programmable to turn on and off. However, it is not fail-safe and if alternating current power is interrupted, the entire memory and program is lost.

SUMMARY OF THE PRESENT INVENTION

It is an object of the present invention to provide a timer which turns on when the ambient light decreases below a certain level and is not set by a certain clock or dependent on ambient light conditions to turn off.

It is a further object of the present invention to provide a timer which operates for a fixed period of time.

It is a further object of the present invention to provide a timer network which has fixed time periods that are randomly selected by networks within the device.

A further objective of the present invention is to provide a timer network capable of turning on and off randomly during a fixed timer period.

A further object of the present invention is to provide a timer device which resets and continues to operate after a temporary interruption in the external power.

It is a further object of the present invention to provide a timer network which has a built-in memory that is not vulnerable to power failure.

Briefly, the preferred embodiment includes a photodetector circuit which generates an electrical detector signal when the ambient light decreases below a certain level. The detector signal is then processed through a hold-off circuit to a flip-flop network having a set and reset input. The signal sets the flip-flop. A signal is then sent to a load switcher network which network is tied intermediate an electrical load and an external power source. A timing circuit is coupled to the flip-flop network to control activation of the flip-flop network. The timing circuit is activated when the flip-flop is set. After the timing circuit completes its cycle, it sends a signal to reset the flip-flop, activating the time delay of the hold-off circuit and turning off the load switcher. The hold-off circuit is such that once the flip-flop is set, which causes the electrical load to be activated, the hold-off circuit prevents further activation of the flip-flop for a certain period of time after the flip-flop is reset and the external load deactivated. The hold-off circuit has a time-constant network to establish this certain period of time, hereafter called the hold-off period.

Accordingly, the present invention provides a timing network which responds to ambient light conditions, runs a prescribed timing cycle and then turns off. Furthermore, with the hold-off network, even though the photodetector generates activating signals, such as when external lamps are turned off by the device, the activating signals are precluded from activating the timer until after the lapse of the hold-off period. This time period may be selected such that by the time it lapses, the ambient light conditions are improper to cause the photodetector to generate a sufficient detector signal. Thus, the hold-off prevents undesired recycling. The timing of the timer is not dependent upon any external clocks nor does it need to be reset or re-established if there is intermittent failure of electrical power.

These and other objects and advantages of the present invention will no doubt become apparent after a reading of the following detailed description of the preferred embodiment which are illustrated in the several figures of the drawing.

IN THE DRAWING

FIG. 1 is a block schematic diagram generally illustrating the principal components of a photodetector timer in accordance with the present invention;

FIG. 2 is a circuit schematic diagram of a photodetector timer of FIG. 1 illustrating switch selectable time periods;

FIG. 3 is a timing circuit diagram for an alternative embodiment of the present invention illustrating randomly selectable fixed time periods.

DETAILED DESCRIPTION OF THE PREFERRED EMBODIMENT

Figure 4:
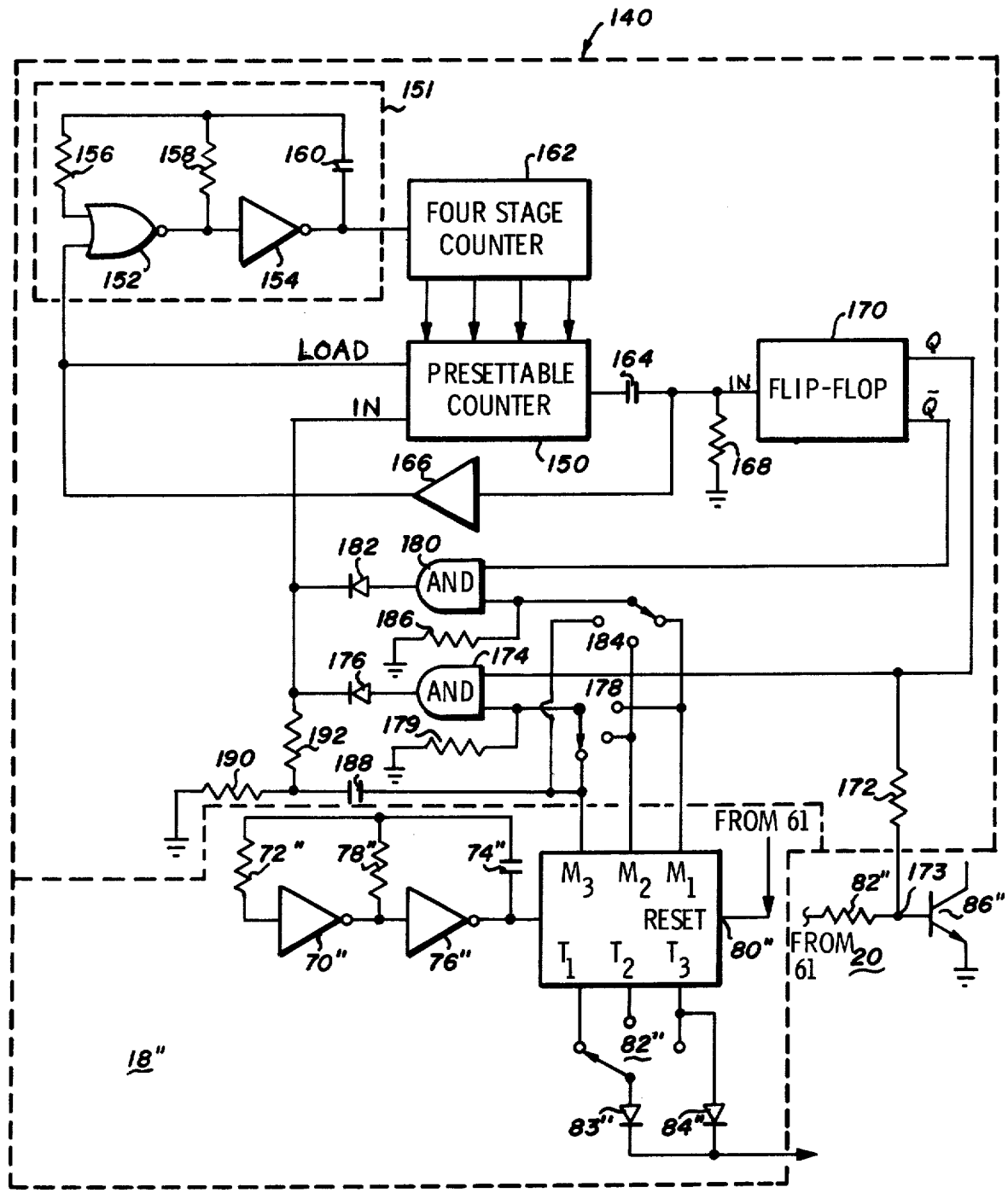
FIG. 4 is a circuit diagram for an alternate embodiment of the present invention illustrating randomly selected on-off periods within a basic time period.

FIGS. 1 and 2 respectfully illustrate block and circuit diagrams of a basic photodetector timer network of the present invention and referred to by the general reference character 10. Basically, the timer 10 plugs into an ordinary AC voltage outlet and actuates an external load, e.g., lamps when a photocell within the device detects impending darkness and deactivates the load after a prescribed timing cycle. Daylight resets the unit and prepares it for a new cycle.

In the network 10, a photodetector circuit 12 generates a detector signal responsive to the ambient light conditions. The detector signals are received by a hold-off circuit 14 which generates a responsive signal to a flip-flop circuit 16 to set the circuit 16. A control signal generated by the flip-flop circuit 16 is fed to a load switcher network 20 which is positioned intermediate to an external load, for example house lamps and a power supply source 22. The control signal is also fed to a timer circuit 18 which controls resetting of the flip-flop network 16 and also to the hold-off circuit 14. The hold-off circuit 14 is adapted such that once it passes a responsive signal to the flip-flop circuit 16 to turn the flip-flop on, it holds off the further passage of responsive signals until a certain time period (hold-off period) after the flip-flop 16 has been reset by a timing circuit 18. The timing circuit 18 is adapted to reset operation of the flip-flop circuit 16 at one or more certain times depending upon the setting in the timing circuit 18.

Referring to the circuit diagram of FIG. 2, all active circuit elements are complimentary metal oxide semiconductor (CMOS) except as noted. The photodetector network 12 includes a photoconducting cell 24 tied in series with a resistor 26 to a voltage source $+V$ so as to provide a voltage divider network. The voltage source $+V$ is generated within the power supply 22 as hereafter explained. Across the resistor 26 is a capacitor 28 and across the photocell 24 is a capacitor 30. Tied to a common node 31 of the photocell 24 and resistor 26 is an amplifier 32 tied in series with a resistor 34 to the common node 31 of the voltage divider. A resistor 38 and capacitor 40 are tied in parallel across the amplifier 32 to an output terminal 42 of the photodetector network 12.

In operation, the resistor 26 and photocell 24 constitute a voltage divider whose output is a function of the degree of illumination of the photocell 24. The capacitors 28 and 30 tend to slow the response time of the photocell circuit, attenuate noise going to the input of the operational amplifier 32, and divide the supply voltage $+V$ so as to reduce the sensitivity of the detector circuit 12 to momentary supply voltage variations. The resistor 34 provides protection to the amplifier 32 against high surge currents. The resistor 38 provides additional hysteresis which means that it resets the operational amplifier at a higher illuminational level of the photocell 24 than is necessary to trigger or decreasing illumination.

The parallel circuit of the capacitor 40 and the resistor 38 tend to speed up the snap action of the amplifier 32 with positive feedback. Thus, the detector signal at the output terminal 42 of the photodetector network 12 is a function of the illumination of the photocell 24.

The hold-off circuit 14 has a resistor 44 tied to the output terminal 42 and to a junction 46. Common to the junction 46 is a diode 48 which is also common to a junction 50. Tied to the junction 50 is a capacitor 52 extending to the ground reference level and a resistor 54.

The flip-flop network 16 includes a capacitor 56 tied to the junction 46 and to the "Set" terminal of a Reset-Set flip-flop device 58. Also tied to the Set terminal of the flip-flop 58 is a resistor 60 extending to ground reference level. The $\overline{Q}$ terminal of the device 58 is tied to an output terminal 61 and to the resistor 54 of the hold-off circuit 14. The Reset terminal of the flip-flop 58 is tied to a resistor 62 in series with a resistor 64 and a resistor 66 to ground reference level. The junction of the resistors 62 and 64 are common to a capacitor 68.

The timing circuit 18 is in the form of an oscillator with cascaded ripple counter stages. The oscillator includes an amplifier 76 together with a resistor 78 and capacitor 74 connected to an amplifier 70 and a resistor 72. The output of the amplifier 76 goes to the input of a counter 80 which multiplies the time period of the oscillator network to desired intervals $T_1$, $T_2$ or $T_3$. The counter 80 "Reset" terminal is connected to the terminal 61. The outputs from the counter 80 are tied to a switch 82 positioned to select the desired time period $T_1$, $T_2$ or $T_3$. The selector arm of the switch 82 is tied to a diode 83 and the terminal $T_3$ to a diode 84. The diodes 83 and 84 are tied in common to the junction of the resistors 64 and 66 of the flip-flop network 16.

The load switcher network 20 includes a resistor 85 tied to the terminal 61 and to the base of a transistor 86.

The collector of transistor 86 extends through a resistor 87 to the voltage reference $+V$. The collector of the transistor 86 is further tied to a control gate 88 which passes current in both directions and which in the preferred embodiment 10 is a triac. The triac 88 is tied in common to the emitter of transistor 86 and to ground reference. The triac 88 is also tied to an external load 90 (e.g., house lamps) which is also tied to an AC input source 92 (e.g., 110 volts AC).

Power supply 22 includes a diode 94 tied to the source 92 and a resistor 96 which is tied to a terminal 97 and capacitor 98 which extends to the ground reference. The junction of the resistor 96 and capacitor 68 is tied to the capacitor 68. Thus, in operation the reference voltage $+V$ for the active components is generated at the terminal 97.

The believed theory of operation is such that when the amplifier 32 of the detector responsive to a signal at the junction 31, the resulting positive step signal is passed through the resistor 44 and capacitor 56 to the Set terminal of the flip-flop 58. The capacitor 56 and resistor 60 differentiate the step signal into a sharp spike which sets the flip-flop 58. When the flip-flop 58 is set, the potential at $\overline{Q}$ drops from the $+V$ reference to zero which in turn starts the timing cycle by gating the counter 80, discharges the capacitor 52 through the resistor 54 thereby activating the hold-off network 14, and removes the forward bias on the transistor 86 through the resistor 85 allowing the current through the resistor 87 normally flowing through the collector of transistor 86 to go to the gate of the triac 88 and turning the triac on.

The switch 82, depending on its setting, selects the output from the counter 80 producing the timing intervals $T_1$, $T_2$ and $T_3$ to obtain the desired time interval for keeping the timer 10 active. The selected signal from the switch 82 passes through the diode 83, resistors 62 and 64 to reset the flip-flop 58, resetting counter 80 and turning off the triac 88. The capacitor 68 together with the resistor 64 forms a low pass filter which assists in keeping noise from resetting the flip-flop 58. The diode 84 assists in turning off the network should the switch 82 malfunction.

To further explain the operation of the hold-off circuit 14, during the timing cycle $\overline{Q}$ is at zero volts as is the capacitor 52. At the end of the timing cycle when the flip-flop 58 is reset, $\overline{Q}$ goes to the $+V$ level and the capacitor 52 commences to charge through the resistor 54. During the initial portion of the charging curve, the photodetector signal at the terminal 42 goes through the resistor 44 and diode 48 into the capacitor 52. Since the time constant of the resistor 44 and capacitor 52 is much greater than that of the resistor 60 and capacitor 56, the signal passing through the capacitor 56 to the Set terminal of the flip-flop 58 is insufficient to set the flip-flop 58. In time, the capacitor 52 is charged to the $+V$ level and the diode 48 disconnects the capacitor 52 from the output terminal 42 of the detector network 12 thereby again allowing a detector signal to pass through the hold-off circuit 14.

The diode 94 in series with the resistor 96 and filter capacitor 98 in the power supply source 22 provide a low voltage DC source $+V$ to operate the integrated circuits and the gate of the triac 88.

To insure that the integrated circuit flip-flop 58 is in the reset state when AC power is first applied to the timer, the capacitor 68 momentarily applies the $+V$ source to the Reset terminal of the flip-flop 58 through the resistor 62. Should alternating current power fail, capacitor 68 is rapidly discharged through resistor 62 and the input gate protection diode of flip-flop 58. Restoration of alternating current power at terminal 92 resets the photodetector timer 10 to "off" condition and requires a typical light-dark ambient condition sequence to restart.

FIG. 3 is an alternative embodiment of a timing circuit and is referred to by the general reference character 18'. The timing circuit 18' may be incorporated to provide a photodetector timer network 10' which provides randomly selectable fixed timed periods of actuation. The network 10' includes the other basic circuits illustrated and described in connection with FIGS. 1 and 2, and is further adapted such that the photodetector network 10' turns on even in the presence of impending darkness but wherein the duration of the timing cycle is not fixed, but is one of three possibilities. Thus, the timer 18' is such that the network 10' comes on at dusk and turns off at various times during darkness. For example, when used for controlling lights within a residence, a random selection of one of several timing periods provides a simulation of a more real-life situation wherein occupants generally turn lights off at different times each day. Thus, the network 10' serves as a security light timing device.

In FIG. 3, the timing network 18' includes various components similar to the timing network 18 in FIG. 2. Those common components carry the same reference numeral distinguished by a prime designation. In the embodiment 18' the mechanical switch 82 of FIG. 2 is not incorporated and electronic gates are utilized in its place. A logic AND gate 120 has one input terminal tied to the terminal 61' and one input terminal tied to the output of the amplifier 76' of the oscillator. The output of the logic AND gate 120 is tied to a flip-flop 122 which is in turn tied to a flip-flop 124 and one input terminal of the input to a logic AND gate 126. The logic AND gate 126 is also tied to the $\overline{Q}_2$ terminal of the flip-flop 124 while the $Q_2$ terminal of the flip-flop 124 is tied to a logic AND gate 128. The outputs of the AND gate 126 and 128 are tied to logic OR gate 130. The counter 80' has the terminal $T_1$ tied to the AND gate 128, the terminal $T_2$ tied to an input of each of the AND gates 126 and 128, and the $T_3$ terminal tied to the logic OR gate 130.

In selecting a cycle time, logic AND gates 126 and 128 are controlled by flip-flops 122 and 124 which together with logic OR gate 130 replace the mechanical switch 82. Thus, which timing signal $T_1$, $T_2$ or $T_3$ is passed first, and therefore the duration of the ON time depends on the output states of the flip-flops 122 and 124. The oscillator section (amplifies 70' and 76') drives the flip-flops 122 and 124 through the logic AND gate 120 during the timer "off" period when $\overline{Q}$ of the flip-flop 58 is at $+V$ potential. When the signal from the hold-off network 14 sets the flip-flop 58, the potential at the $\overline{Q}$ terminal of the flip-flop 58 goes to zero thereby freezing the output states of the flip-flops 122 and 124.

For illustrative purposes the timing circuit 18' may function for cycle times of 3, 4½ and 6 hours by the interconnections of the oscillator network, flip-flop 122, flip-flop 124, logic AND gate 126, logic AND gate 128 and logic OR gate 130. For $T_1 = 1\frac{1}{2}$ hours, $T_2 = 3$ hours, and $T_3 = 6$ hours, the following logic table applies for the outputs of the flip-flops 122 and 124:

| $Q_1$ | $Q_2$ | $\overline{Q}_2$ | Cycle time, hours |
|---|---|---|---|
| 1 | 0 | 1 | 3 |
| 1 | 1 | 0 | 4½ |
| 0 | 1 | 0 | 4½ |
| 0 | 0 | 1 | 6 |

Since there is equal probability for $Q_1$ and $Q_2$ to be in either the logic "1" or logic "0" state, it is apparent that the photodetector network 10' should be on for 4½ hour periods twice as frequently as either the 3- or 6-hour periods. Various factors determine the precise instant that the photodetector circuit 12 trips, including ambient light and the precise frequency of the oscillator. Therefore, the final state of the flip-flops 122 and 124 is unpredictable and with it the unpredictability of the day-by-day cycle times of the network 10'.

It may be noted that intermediate the amplifier 70' and 76', a potentiometer 132 is put in place of the fixed resistor 78. Changing the value of the timing resistor 132 changes the overall cycle time. However, it does not change the interrelations between the timing periods $T_1$, $T_2$ and $T_3$. Accordingly, cycle times of 2, 3 and 4, or 1, 1½ and 2 hours are possible.

FIG. 4 is a circuit diagram of a timing network 140 which is included with the basic timer 10 of FIG. 2 to provide an alternate embodiment of a photodetector timer network 10" of the present invention. The network 140 is added such that the external load is randomly turned on and off during the basic on timing cycle. When used as a security light timer, this unpredictable and random on-off action serves as a further security element in that from the exterior it simulates actual living conditions within the home. The timer 140 includes a presettable counter 150 receiving input from a gateable high frequency oscillator 151 comprising a logic NOR gate 152 in series with an amplifier 154. The amplifier 154 together with a resistor 158 and capacitor 160 is connected to the logic NOR gate 152 and a resistor 156. A four-stage counter 162 is at the output of the oscillator 151 and provides four outputs to the presettable counter 150. The output of the counter 150 goes to a capacitor 164 which is also tied through a feed-back amplifier 166 to the input of the counter 150 and to the logic NOR gate 152 of the oscillator 151. The capacitor 164 is also tied to a resistor 168 extending to ground and to the input terminal of a flip-flop 170. The Q output terminal of the flip-flop 170 is tied to a resistor 172 which extends to a terminal 173 on the input of the load switcher 20". The Q terminal is also tied to one input terminal of a logic AND gate 174. The output of the logic AND gate 174 is tied to a diode 176 which is common to the input of the counter 150. The other input terminal of the logic AND gate 174 is tied to a switch 178 and to a grounded resistor 179. The three-way switch 178 is tied to three terminals M1, M2 and M3 of the counter 80". The $\overline{Q}$ terminal from the flip-flop 170 is tied to one input terminal of a logic AND gate 180. The output of the logic AND gate 180 is tied to a diode 182 to the input of the counter 150. The other input terminal of the logic AND gate 180 is tied to a three-position switch 184 and to a grounded resistor 186. One terminal of the switch 184 is common to the M1 output of the counter 80" and to one terminal of the switch 178. A second terminal of the switch 184 is common to the M2 output terminal of the counter 80" and to a terminal of the switch 178. A third terminal of the switch 184 is common to the M3 output terminal of the counter 80" and to a terminal of the switch 178. The terminal M3 of the counter 80" is also tied to a capacitor 188 which extends to the junction of a grounded resistor 190 and a resistor 192 to the input of the counter 150.

In operation, the counter 150 counts up with each input pulse until it overflows at which time it generates an output signal. The counter 80" produces additional timing pulses at the terminals M1, M2 and M3. Typically, the period of the signal of M3 is twice as long as the period of the signal at M2 which is twice as long as the period of the signal at M1. These periods are typically minutes compared to periods of hours for the signals at terminals $T_1$, $T_2$ and $T_3$. Assuming that the switch 184 is in the M1 position and that the flip-flop 170 is in the $\overline{Q}$ high state, the logic AND gate 180 passes the pulses from M1 through the diode 182 to the presettable counter 150 which advances step by step. The resistors 190 and 192 provide direct current restoration for the input of the counter 150. When the counter 150 overflows, the positive step at the output of the counter 150 is differentiated into a spike by the capacitor 164 and resistor 168. The spike drives the amplifier 166 and changes the output state of the flip-flop 170. The output Q terminal of the flip-flop 170, which is now in the high state, forward biases the transistor 86" through the resistor 172 which in turn turns off the triac 88 thereby removing power from the external load. When used for controlling house lamps, this in effect turns lamps off.

The amplifier 166 squares up the differentiated output of the counter 150 into a positive rectangular waveform which stops the high frequency oscillator 151, thereby freezing the output states of the four-stage counter 162. The output of the amplifier 166 also presets the counter 150 with the momentarily frozen output state of the counter 162 thus determining the duration of the timing cycle (power off). The actual cycle off time depends on which of the timing pulses, M1, M2 or M3 is passed through the logic AND gate 174 and the preset count of the counter 150. When the counter 150 again overflows, the Q state of the flip-flop 170 goes low thereby turning on the triac 88, applying power to the external load and initiating a new cycle.

It is common to use CMOS technology and since most CMOS resistive-capacitive oscillators are inherently unstable, especially in operating on unregulated power and in varying thermal environments, the timer 140 cycles on-off with random timing if the period of the timing pulses M1, M2 and M3 are many, many times longer than the period of the high frequency oscillator 151. These random on-off cycles are superimposed on the ON cycle of the basic timing cycle. Mixing of the two signals takes place in the forward biasing of the transistor 86" through the resistor 82" and resistor 172. The OFF cycle of the basic timer predominates.

The capacitor 188 together with resistors 190 and 192 couples the M3 timing pulses directly to the input of the presettable counter 150 which insures cycling even if switches 184 and 178 malfunction. The resistors 179 and 186 provide a direct current return to ground for inputs of the logic AND gates 180 and 174 should these switches malfunction.

While, for the sake of clearness and in order to disclose the invention so that the same can be readily understood, the specific embodiments have been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered to be part of the invention.

What is claimed is:

1. A photodetector timer network, comprising:
   a photodetector circuit for generating an electrical detector signal responsive to a decreasing light level;
   a hold-off circuit for receiving the detector signal from the photodetector circuit and passing a responsive signal;
   a flip-flop network having a set and a reset input with the set input receiving the responsive signal from the hold-off circuit such that the flip-flop is set pursuant to the responsive signal and generates an output control signal pursuant to the setting of the flip-flop network;
   a first timing circuit coupled to the flip-flop network to receive the control signal, the timing cycle of the timing circuit being responsive to the control signal and generating reset signals for the flip-flop network; and p1 a load switcher network coupled to the flip-flop network and intermediate an external electrical load and an external electrical power source, the load switcher network being responsive to the control signal for controlling electrical power from the power source to the external load;
   the hold-off network being further coupled to the output of the flip-flop network to receive the control signal and delay the flip-flop network from being set responsive to the detector signal if the external load is deenergized under low light conditions within a predetermined time period.

2. A photodetector timer network of claim 1 wherein the photodetector circuit includes a voltage divider having a photocell with the output of the voltage divider being a function of the illumination of said photocell and a snap-acting amplifier coupled intermediate to the voltage divider and the hold-off circuit.

3. A photodetector timer network of claim 2 wherein the photodetector circuit further includes capacitive elements across the voltage divider for suppressing electric noise.

4. A photodetector timer network of claim 1 wherein the hold-off circuit is further adapted to receive a second signal which second signal is responsive to the conductive state of the flip-flop network and for holding-off the responsive signal for a period after the flip-flop network is reset.

5. A photodetector timer network of claim 4 wherein the hold-off circuit inhibits the transfer of the detector signal to the flip-flop during a time period determined by a charge-discharge means responsive to the flip-flop output control signal.

6. A photodetector timer network of claim 1 wherein the timing circuit includes means for generating time signals for controlling resetting of the flip-flop to interrupt generation of control signals after a predetermined time period.

7. A photodetector timer network of claim 6 wherein the timing circuit includes an oscillator and a counter, said counter being set pursuant to the control signal and generating a predetermined timing signal pursuant to a number of cycles of said oscillator after the initial control signal.

8. A photodetector timer network of claim 5 wherein the hold-off circuit includes a resistive element intermediate the photodetector circuit and the flip-flop network, a unidirectional control gate coupled to said resistive element and to a capacitive element, said capacitive element being coupled to a reference potential, and the junction of said gate and capacitive element being coupled through a resistive element to the output of the flip-flop network to receive the control signal.

9. A photodetector timer network of claim 7 wherein the timing circuit includes an oscillator and a counter network for counting cycles of said oscillator, said counter being set pursuant to the control signal and generating a plurality of timing signals pursuant to a predetermined number of cycles of said oscillator after being set by the control signal.

10. A photodetector timer network of claim 1 wherein
the load switcher network includes a bidirectional current control gate with one gate tied to a transistor and a voltage reference source and the other gate tied to an output terminal to be engaged by a load, said transistor being coupled to the output of the flip-flop network to receive the control signal.

11. A photodetector timer network of claim 1 wherein
the reset circuit of the flip-flop includes means to reset the flip-flop after temporary loss of the external power source.

12. A photodetector timer network of claim 10 wherein
the reset terminal of the flip-flop is further coupled to a power supply through a reactive circuit resetting the flip-flop after an interruption of electrical power to the network.

13. A photodetector timer network of claim 10 wherein
the hold-off circuit is further adapted to recieve a second signal which second signal is responsive to the conductive state of the flip-flop network for holding-off the responsive signal for a period after the flip-flop network is reset.

14. A photodetector timer network of claim 13 wherein
the hold-off circuit includes a first resistive element intermediate the photodetector circuit and the flip-flop network, a unidirectional control gate coupled to said first resistive element and to a first capacitive element, said first capacitive element being coupled to a reference potential, the junction of said gate and first capacitive element being coupled through a second resistive element to the output of the flip-flop network.

15. A photodetector timer network of claim 12 wherein
the flip-flop network further includes a resistance-capacitance path of low resistance intermediate the reset input and the power source and a high resistance path intermediate the reset input and ground reference.

16. A photodetector timer network of claim 1 wherein
the timing circuit includes means to randomly select one of a set of different timing signals.

17. A photodetector timer network of claim 16 wherein
the timing circuit includes an oscillator and a time counter, said counter being set pursuant to the control signal and generating a plurality of different timing signals timed pursuant to a predetermined count of cycles of said oscillator after the initial control signal; and logic circuitry connected to receive said plurality of timing signals, the control signal and oscillator signal, the logic circuitry being adapted to deliver a reset signal to the flip-flop network upon the random simultaneous timing of the control signal, oscillator signal and one of said timing signals.

18. A photodetector timer network of claim 17 wherein
the logic circuitry includes a first AND gate for receiving the control signal and oscillator signal, a first flip-flop connected to the output of said first AND gate, a second flip-flop connected to the output of the first flip-flop, a second AND gate connected to the output of the first flip-flop, to the second flip-flop and to said time counter, a third logic AND gate connected to the output of the second flip-flop and said time counter, and a logic OR gate tied to the outputs of the second and third AND gates and said time counter, the output of said OR gate extending to the reset of the flip-flop network.

19. A photodetector timer of claim 1 further including
a second timing circuit for randomly interrupting the timing cycle of the first timing circuit.

20. A photodetector timer network of claim 19 wherein
the first timing circuit includes a first oscillator and a time counter for generating a first set of time signals and a second set of time signals, the time interval of said second set of time signals being substantially less than that of the first set of time signals, and means for delivering select ones of the first set of time signals to the reset of the flip-flop network; and
a second timing circuit for receiving the second set of time signals and including two logic AND gates interconnected to said time counter to receive said second set of time signals and to the output of a second flip-flop to select which of said two AND gates pass selected ones of said second set of time signals to the input of a presettable counter whose input is connected to the two logic AND gates and whose output is connected to the input of said second flip-flop, said presettable counter having a plurality of preset input terminals, said preset input terminals being connected to a gatable oscillator-counter network, differentiating means intermediate the output of said presettable counter and said second flip-flop to differentiate the output of the presettable counter, a squaring amplifier intermediate said differentiating means and the input to said gatable oscillator-counter and a load terminal of said presettable counter to preset said presettable counter and freeze said oscillator-counter responsive to the output of said presettable counter.

* * * * *